United States Patent
Ritter

(10) Patent No.: US 6,774,949 B2
(45) Date of Patent: Aug. 10, 2004

(54) METHOD AND SYSTEM FOR ENHANCED RESOLUTION IN UPCONVERTED VIDEO USING IMPROVED INTERPOLATION

(75) Inventor: David Wayne Ritter, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 475 days.

(21) Appl. No.: 09/974,480

(22) Filed: Oct. 9, 2001

(65) Prior Publication Data

US 2003/0067553 A1 Apr. 10, 2003

(51) Int. Cl.[7] ............................................. H04N 11/00
(52) U.S. Cl. ...................................... 348/458; 348/448
(58) Field of Search ................................. 348/448, 452, 348/450, 453, 458, 581; 382/299, 300; 345/698, 699

(56) References Cited

U.S. PATENT DOCUMENTS

| | | | | |
|---|---|---|---|---|
| 4,593,315 A | * | 6/1986 | Willis et al. | 348/448 |
| 5,177,610 A | * | 1/1993 | Wilkinson | 348/452 |
| 5,784,114 A | * | 7/1998 | Borer et al. | 348/452 |
| 5,936,676 A | * | 8/1999 | Ledinh et al. | 348/452 |
| 6,501,509 B1 | * | 12/2002 | Han | 348/441 |
| 6,630,961 B1 | * | 10/2003 | Shin et al. | 348/448 |

* cited by examiner

*Primary Examiner*—Victor R. Kostak
(74) *Attorney, Agent, or Firm*—Steven L. Nichols; Rader, Fishman, & Grauer PLLC

(57) ABSTRACT

Standard definition video can be upconverted to high-definition video without degrading the appearance of edges, lines and other visual transitions in the image with a diagonal geometry. Each horizontal scan line of the video is monitored to identify the location of such visual transitions. The transitions are then matched in successive scan lines. Successive scan lines are then morphed, e.g., shifted forward or backward to move the transition in each line toward an average position for the transition as located in the two successive scan lines. The successive morphed lines are then added to produce a single interpolated line that is interlaced between its parent lines in a resulting high-definition video signal.

21 Claims, 6 Drawing Sheets

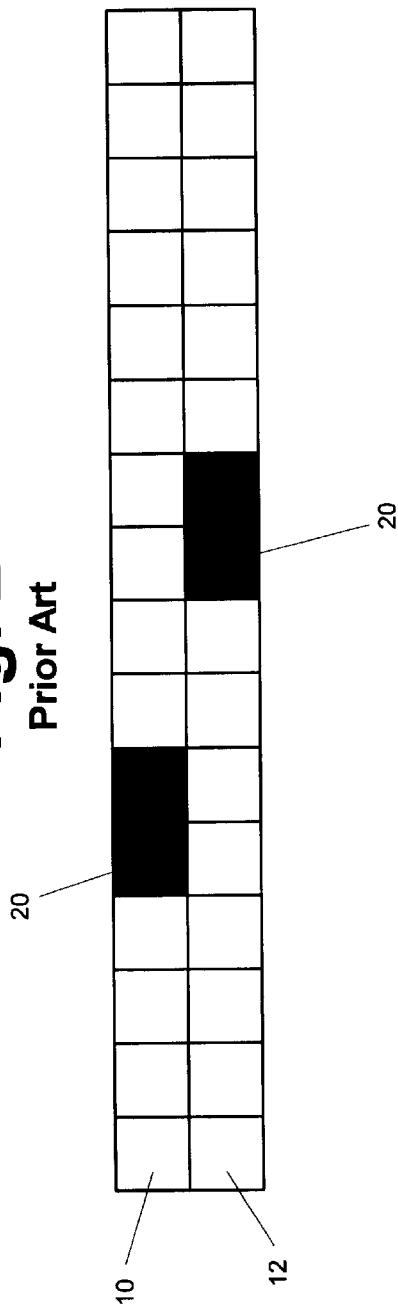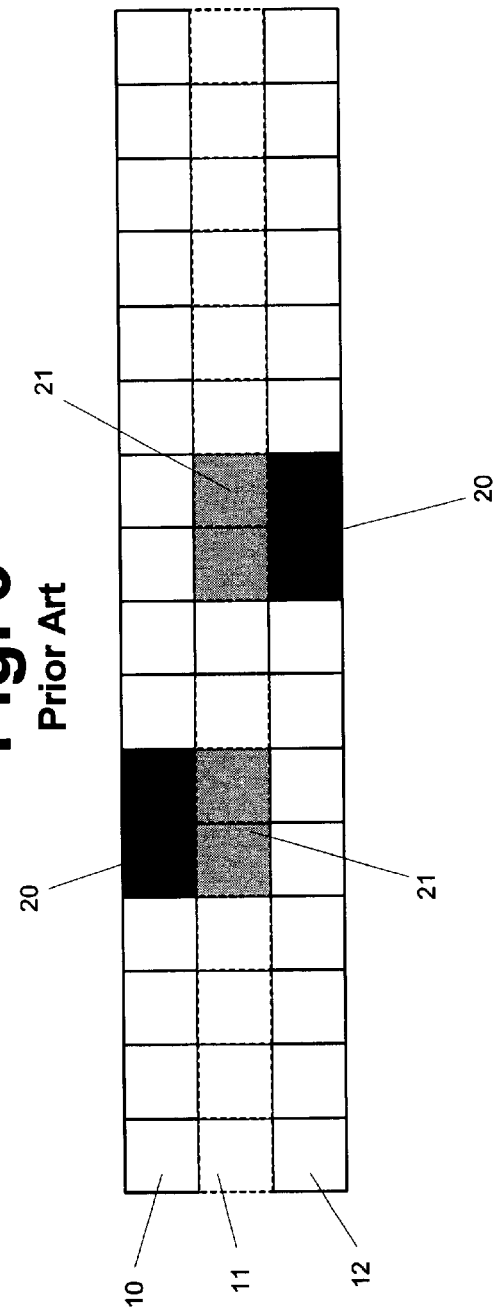

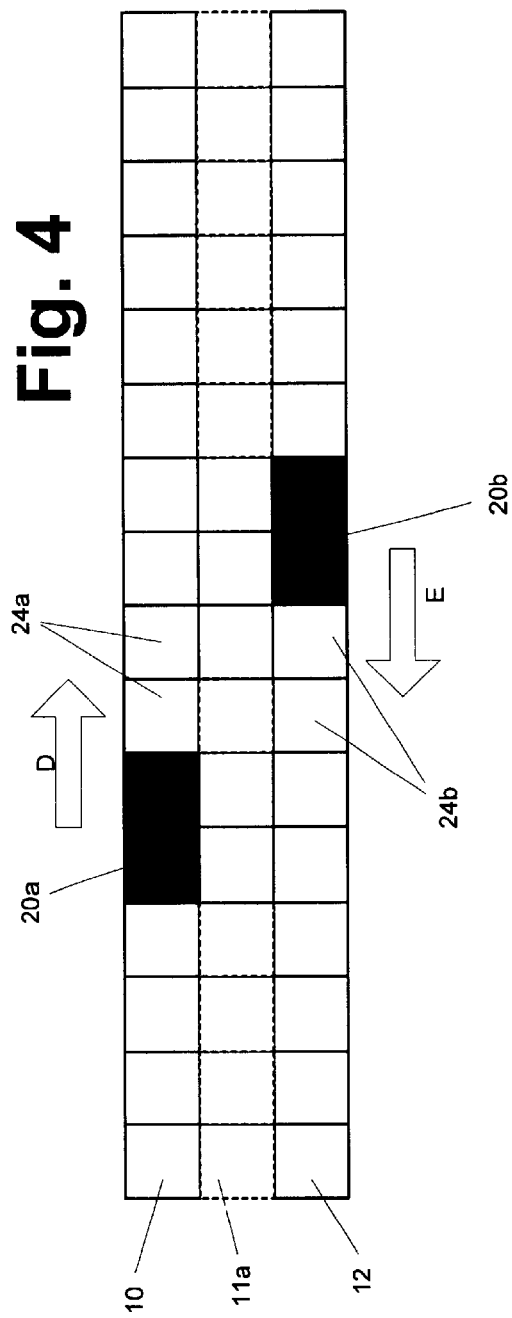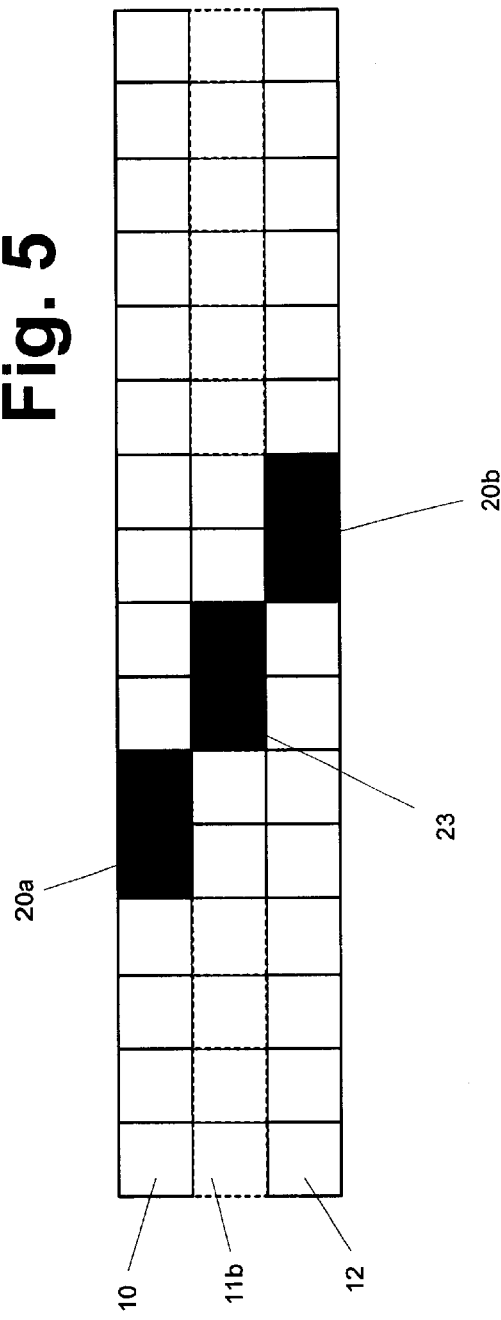

METHOD AND SYSTEM FOR ENHANCED RESOLUTION IN UPCONVERTED VIDEO USING IMPROVED INTERPOLATION

FIELD OF THE INVENTION

The present invention relates to the field of video signal processing. More specifically, the present invention relates to the field of enhancing the resolution of digital video images, particularly when those images are upconverted from standard definition to high definition. The present invention provides, among other things, an improved interpolation method for adding scan lines between existing lines of a video image.

BACKGROUND OF THE INVENTION

Video imaging and programming are very popular and important in modem society and are widely used for a number of purposes such as education and entertainment. Because of this importance and popularity, there are many means and methods in use for distributing and recording video images and video programming. For example, video programming is broadcast to television receivers over the air and through cable television systems. Video programming is also recorded and distributed on video tapes and disks. Video programming may be transmitted as streaming data or a compressed file that moves over a computer network, such as the Internet. Static video images may also be stored and distributed in all these ways. These many different methods and means of storing and distributing video programming and images attest to their importance and popularity.

In addition to wanting a large selection of readily available video programming and images, consumers and viewers also want video programming and images that are of the highest possible quality. The images as displayed on televisions, video monitors and other display devices should be as crisp and clear as possible. Consequently, much technology is devoted to devices and methods that enhance the resolution and/or appearance of a video image as displayed on a monitor or display device.

For example, the television industry is in the process of migrating from a standard definition format to a "high definition" or "HD" format. HD television signals contain significantly more visual data and thus are able to provide picture quality that is far beyond what has been conventionally available to television viewers. However, receiving and using HD television signals requires a television set that is constructed to handle the additional amounts of video data provided by the HD formatted television signal. Additionally, the HD video signal, when generated, includes a larger amount of visual data, e.g., more pixels or more scan lines per image.

This poses a problem with regard to the vast amount of video programming, movies, television shows, etc. that have been produced in standard definition. Clearly the television industry and video consumers would be reluctant to move into the HD regime if doing so meant that all previous standard definition programming could no longer be viewed on their HD television sets. Consequently, there is a process for "upconverting" standard definition images and programming into a form that can be displayed on an HD television system.

Before any standard definition programming can be shown on an HD television system, it must go through a process that generates additional visual data from the existing data to supply the total amount of image data that will be expected and required by the HD system. In one example, this is done by spacing apart each horizontal scan line of a standard definition video image and filling in each such spacing with an interpolated scan line, i.e., a line made by averaging pixels vertically from the lines above and below.

This process is illustrated in FIG. 1. As shown in FIG. 1, a first scan line (10) made up of a number of pixels is separated from a subsequent scan line (12). An interpolated line (11) is then created between the two. To create the data for this line, pixels from the parent lines (10 and 12) are averaged. Each vertical pixel set, e.g., (13), is averaged. Pixel (A) from the first parent line (10) and pixel (B) from the second parent line (12) are averaged to create pixel (C) in the interpolated line. This procedure is repeated along the lines until the interpolated line (11) is fully created.

Thus, the process of upconversion can be used to reformat standard definition video programming into a form that can be used by a high definition system. The principles of upconversion can also be used to decompress video images or programming that have been compressed, i.e., downsampled, for transmission. Compression, i.e., a reduction in the amount of data being stored or recorded, makes it easier to transmit or broadcast the remaining, "compressed" data.

In downsampling, for example, the data required for a visual image, and consequently the resolution of the image, is reduced in the following manner. A sample area of the image containing a number of pixels is replaced by a single pixel. The color and other characteristics of the single replacement pixel may be an average of the color or other characteristics of all the pixels in the sample area. Consequently, the number of pixels in the image is reduced by a desired factor. However, resolution is also obviously lost because the amount of data describing the picture is reduced by the averaging.

Using the principles described above, Upconversion can be applied to effectively reverse this process, i.e., decompress a downsampled image or video program. However, because downsampling averages image data to generate fewer pixels, an amount of image data is lost in downsampling that cannot be recovered. Upconversion then uses further averaging to guess at what intervening pixels should look like. Consequently, an image that has been downsampled and then upconverted will not be as defined or clear a picture as the original.

Interpolation of video data for upconversion can be particularly inaccurate where there are object edges or other visual transitions with a diagonal geometry in the video image. Because the location of such an edge changes from horizontal line to horizontal line in the image, perhaps in a non-linear manner, averaging pixel data vertically to interpolate a line containing the edge will frequently blur the edge and decrease the appearance and effective resolution of the resulting image.

This effect is illustrated in FIGS. 2 and 3. FIG. 2 illustrates two succeeding scan lines (10 and 12) of a video image. An edge, line or other visual transition (20) in the image cuts diagonally across these two lines (10 and 12). FIG. 3 illustrates the creation of an interpolated line (11) between the two parent lines (10 and 12). As shown in FIG. 3, a vertical pixel averaging results in a gray area (21) being formed around the break in the edge (20). Obviously, this is approach does not preserve continuity or definition in the appearance of the edge (20).

Consequently, there is a need in the art for an improved means and method of interpolating lines in a visual image that is being upconverted, particularly where those lines contain an object edge, line or other visual transition with a diagonal geometry.

SUMMARY OF THE INVENTION

The present invention meets the above-described needs and others. Specifically, the present invention provides an improved means and method of interpolating lines in a visual image that is being upconverted, particularly where those lines contain an object edge, line or other visual transition with a diagonal geometry.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a video signal upconversion system that includes: a detector for detecting visual transitions in a digital video signal; a comparator, connected to the detector, for matching visual transitions in successive scan lines in the digital video signal; variable delay filters controlled by a skew signal from the comparator for delaying or accelerating the digital video signal so as to shift a visual transition in a scan line toward an average location between matched portions of the transition in successive scan lines; and a summing circuit for adding successive scan lines as skewed by the variable delay filters to generate an interpolated scan line.

Preferably, the system further includes a controlled buffer for interlacing scan lines from the video signal with interpolated scan lines output by the summing circuit. Preferably, the detector is a luma detector.

The video signal may be a color video signal. In which case, the variable delay filters shift visual transition in scan lines for each color component of the video signal according to the skew signal. In this way, a color video signal can be upconverted by the system.

The present invention also encompasses the methods of making and using a system like that described above. For example, the present invention encompasses a method of upconverting a video signal by (1) detecting visual transitions in a digital video signal; (2) matching visual transitions in successive scan lines in the digital video signal; (3) delaying or accelerating the digital video signal so as to shift a visual transition in a scan line toward an average location between matched portions of the transition in successive scan lines; and (4) adding successive scan lines as skewed by the delaying or accelerating to generate an interpolated scan line.

Finally, it should be noted that the present invention can be implemented as hardware, firmware or software. Consequently, the present invention also encompasses computer-readable instructions stored on a computer-readable medium that a computer or processor to upconvert a video signal by: detecting visual transitions in the digital video signal; matching visual transitions in successive scan lines in the digital video signal; delaying or accelerating the digital video signal so as to shift a visual transition in a scan line toward an average location between matched portions of the transition in successive scan lines; and adding successive scan lines as skewed by the delaying or accelerating to generate an interpolated scan line. The computer-readable may further cause the computer or processor to interlace scan lines from the video signal with interpolated scan lines to generate a high-definition video signal. Finally, where the input video signal is a color video signal, the computer-readable instructions may further cause the computer or processor to shift visual transitions in scan lines for each color component of the video signal.

BRIEF DESCRIPTION OF THE DRAWINGS

The accompanying drawings illustrate preferred embodiments of the present invention and are a part of the specification. Together with the following description, the drawings demonstrate and explain the principles of the present invention.

FIGS. 1, 2 and 3 illustrate of a conventional interpolation technique.

FIGS. 4 and 5 illustrate an interpolation technique according to the present invention.

Throughout the drawings, identical elements are designated by identical reference numbers.

DETAILED DESCRIPTION OF THE PREFERRED EMBODIMENTS

In previous interpolation systems, interpolated lines have been created by averaging the characteristics, e.g., signal amplitude, of two or more parent lines. The averaged data of the parent lines then defines an intermediate, interpolated line. As demonstrated above, this amplitude averaging technique inadequately interpolates, in particular, object edges or other visual transitions having a diagonal geometry within the video image.

Under the principles of the present invention, an object edge, line or visual transition having a diagonal geometry in the video image is treated differently for purposes of generating an interpolated line. FIG. 4 illustrates two succeeding scan lines (10 and 12) of a video image. An edge, line or other visual transition (20) in the image cuts diagonally across these two lines (10 and 12).

According to the present invention, the location of the transition (20) is identified in each of the parent lines (10 and 12). The data for those lines (10 and 12) is the manipulated to move the transition (20) in each of the two lines (10 and 12) to an averaged location. In the example of FIG. 4, output of the data for line (10) is accelerated to shift the transition (20*a*) forward in the direction of the arrow (D), e.g., toward the pixels (24*a*). Similarly, the output of the data for line (12) is delayed to shift the transitions (20*b*) backward in the direction of the arrow (E), e.g., toward the pixels (24*b*).

After this morphing of the lines (10 and 12) is accomplished to move the transition in each line toward an average position, the two morphed lines are added to create an interpolated line (11*b*: FIG. 5). As shown in FIG. 5, the result is a continuous, well-defined rendering of the transition (20) with an additional scan line (11*b*) that does not suffer from the loss of definition experienced in the prior art.

Figure 1:
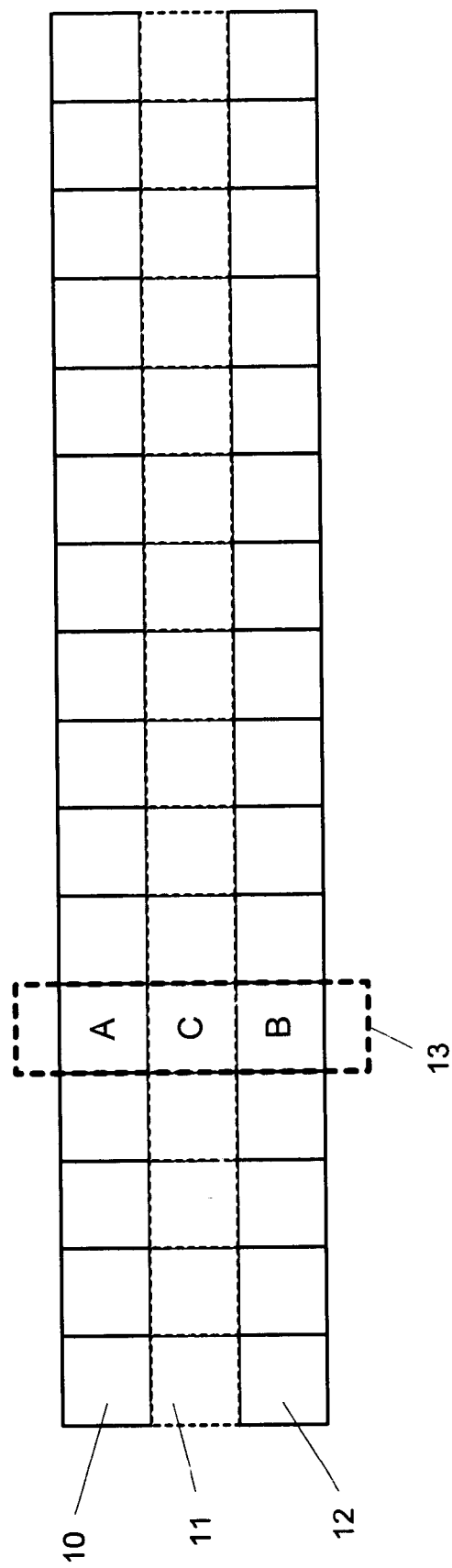
Figure 6:
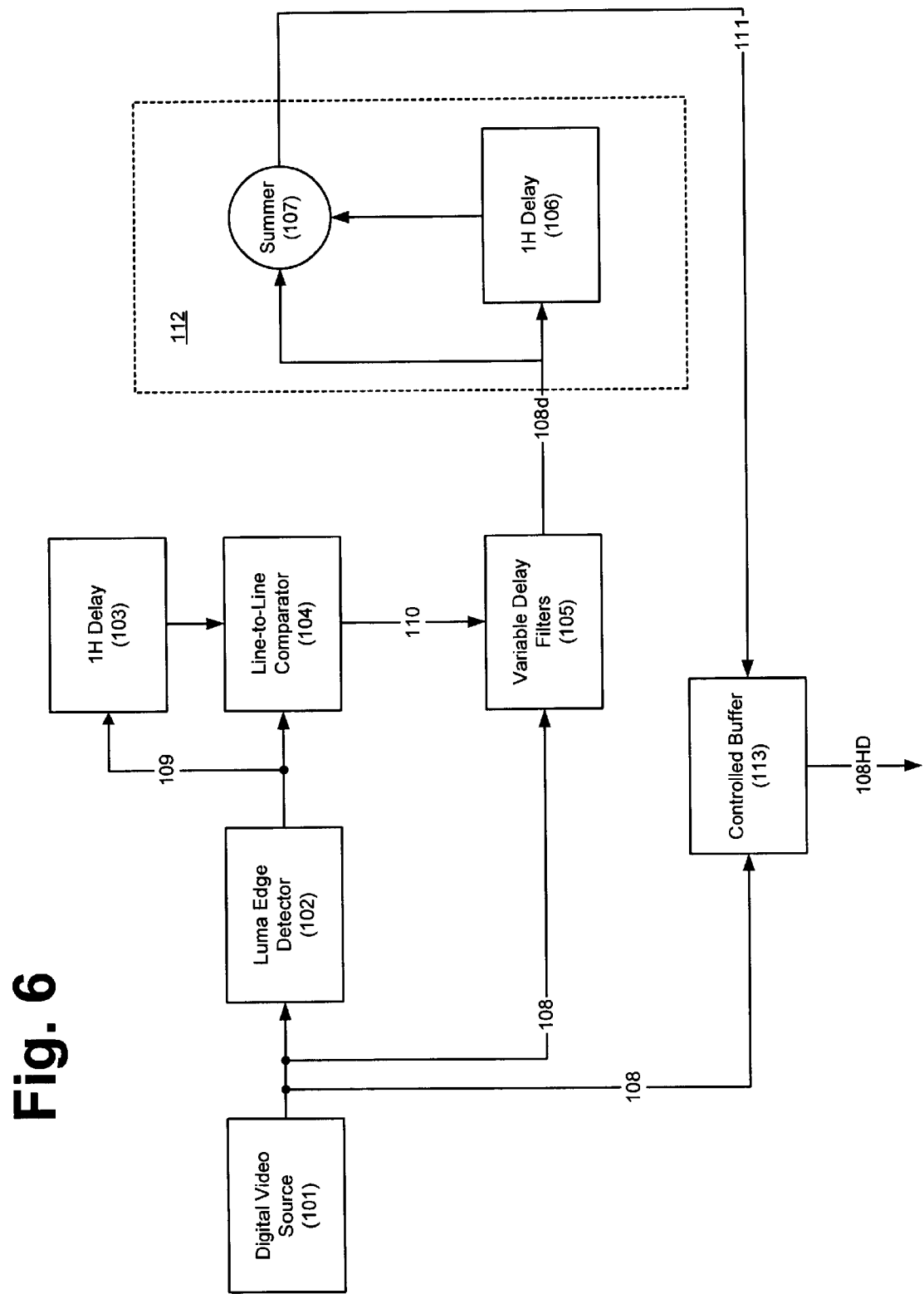
FIG. 6 is a block diagram of a preferred system according to the principles of the present invention for interpolating lines within an upconversion process.

FIG. 6 illustrates a video signal processing system according to the principles of the present invention. As shown in FIG. 6, the system is connected to a digital video signal source (101). This source (101) may be, for example, a cable or satellite television system, a digital video disk (DVD) player, a compact-disc Read Only Memory (CD-ROM) drive, a video compact disc (VCD) drive, etc. The source feeds the system a digital video signal (108).

The digital video signal (108) is fed to a luma edge detector (102), a set of variable delay filters (105) which can accelerate or decelerate the video data stream, and a controlled buffer (113). The operation of each of these components will be described in detail below.

The luma edge detector (102) measures the brightness data of the video signal, pixel by pixel. When a change in the brightness data occurs that exceeds a predetermined threshold, the luma detector (102) identifies that as the location of an edge, line or other visual transition (referred to collectively hereinafter as "visual transitions") in the underlying video image. A signal (109) identifying the location of detected visual transitions is output to a 1 H delay (103) and a line-to-line comparator (104).

The line-to-line comparator (104) receives the signal (109) identifying the location, and other identifying information, for visual transitions in the current scan line directly from the edge detector (102). The line-to-line comparator (104) also receives a signal through the delay (103) identifying the location, and other identifying information, for visual transitions in the previous scan line. The line-to-line comparator (104) then compares the transitions in the two lines and matches transitions in the two lines as being part of a single visual transition in the underlying video image.

While this process is occurring the incoming video signal (108) is also fed to a set of variable delay filters (105). The delay filters (105) are controlled by the line-to-line comparator (104). A skew signal (110) from the line-to-line comparator (104) causes the variable delay filters (105) to accelerate or delay the data of each scan line so that transitions in that line are shifted toward an average position between the locations of matching transitions in succeeding scan lines. This is illustrated in FIGS. 4 and 5 and described above.

The filtered video signal (108d) is output by the variable delay filters (105) to an summing circuit (112) that adds two succeeding morphed scan lines together to create a single interpolated line. The adder (112) includes a 1 H delay (106) that delays a first of the two scan lines being added together. The 1 H delay (106) that feeds that first scan line to a summer (107) as the summer (107) is also receive the second scan line to be added without any delay from the filters (105). The summer (107) then adds the two lines together and outputs a signal (111) for an interpolated line (e.g., 11b; FIG. 5).

A controlled buffer (113) receives, line-by-line, the incoming video signal (108) and the data for interpolated lines (111) and combines the two signal into a single high-definition video signal (108HD). The controlled buffer (113) outputs a first scan line (e.g., 10; FIG. 5) from the digital video source (101). The controlled buffer (113) then buffers the video signal (108) while outputting an intermediate interpolated scan line (e.g., 11; FIG. 5) from the signal (111). The buffer (113) then outputs a second scan line (e.g., 12; FIG. 5) from the signal (108). In this way, the interpolated lines created by the system of FIG. 6 are interlaced between the standard definition scan lines already provided in the original video signal (108).

Figure 7:
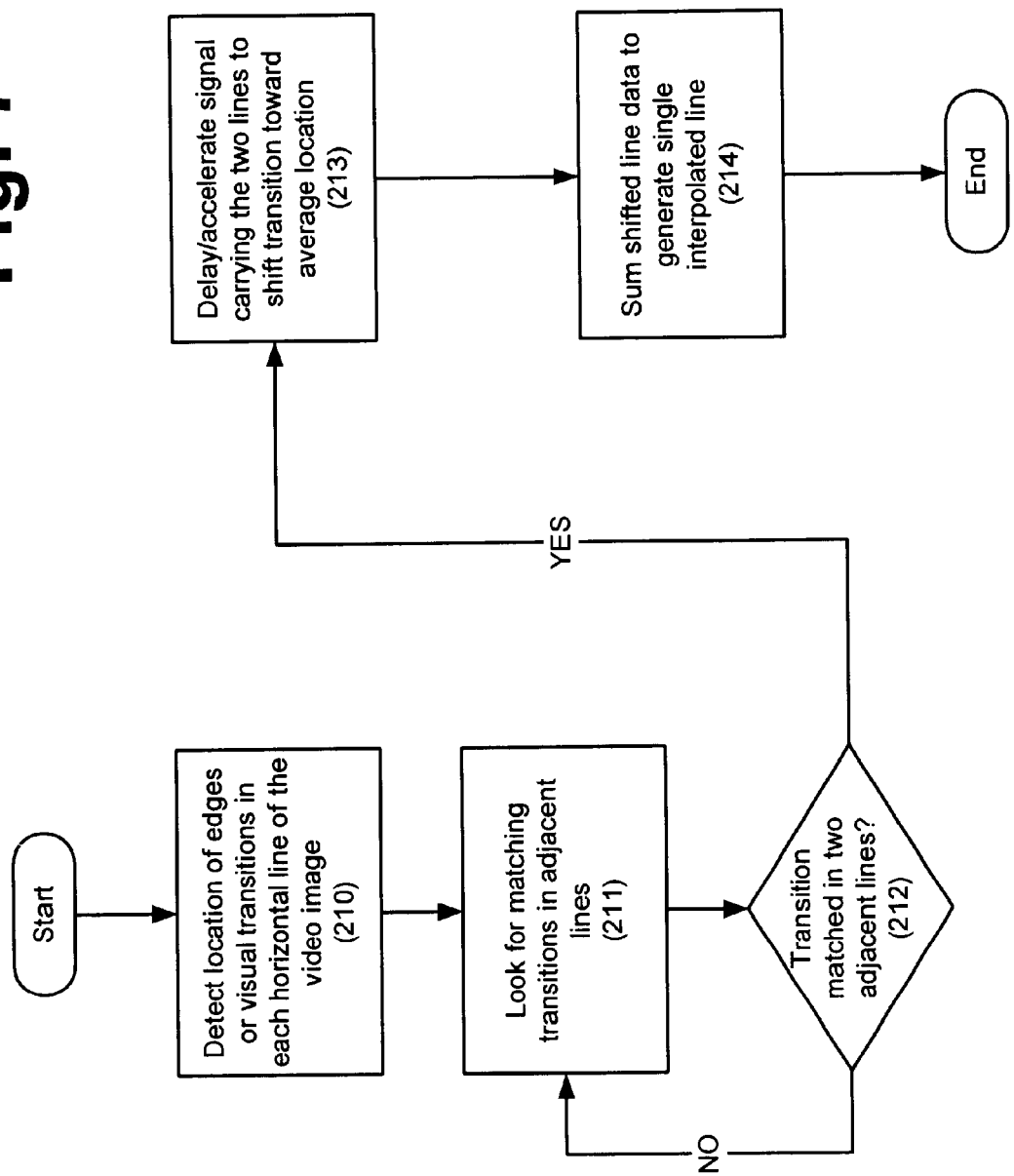
FIG. 7 is a flow chart illustrating a preferred method, according to the present invention, of interpolating lines in a video upconversion process.

FIG. 7 is a flowchart illustrating a preferred method of enhancing the appearance of vertical edges and other visual transitions in a video image being upconverted according to the present invention. This method can be implemented by, for example, the system illustrated in FIG. 6. However, this method can also be carried out by an appropriate piece of software running on a processor and using the data of the incoming video signal as input data. The flowchart of FIG. 7 serves as a disclosure of and outline for such a software implementation of the invention. Given the disclosure of FIG. 7, one of ordinary skill in the programming arts could prepare a software implementation of the present invention.

As shown in FIG. 7, the method begins by detecting the location of visual transitions in each horizontal scan line of the incoming video signal (210). Next, matching transitions in succeeding scan lines will be identified (211). Where such a match is found (212), the two lines will be morphed, i.e., the data stream for each line will be accelerated or delayed to shift the transition in that line toward an average location splitting the difference between the locations of the matched transition in the two succeeding scan lines (213).

Next the morphed or time-shifted scan lines are added (214). The result is a new interpolated line that can be interlaced between the two parent lines to upconvert the video image without overly sacrificing clarity and resolution in the resulting video images.

In the foregoing the present invention has been described in a system in which two parent lines are morphed and summed to produce an interpolated line. The present invention is not restricted to this line-doubling scenario. Rather, as will be clear to those skilled in the art, the principles of the present invention can be readily applied to other upconversion ratios as needed.

Figure 8:
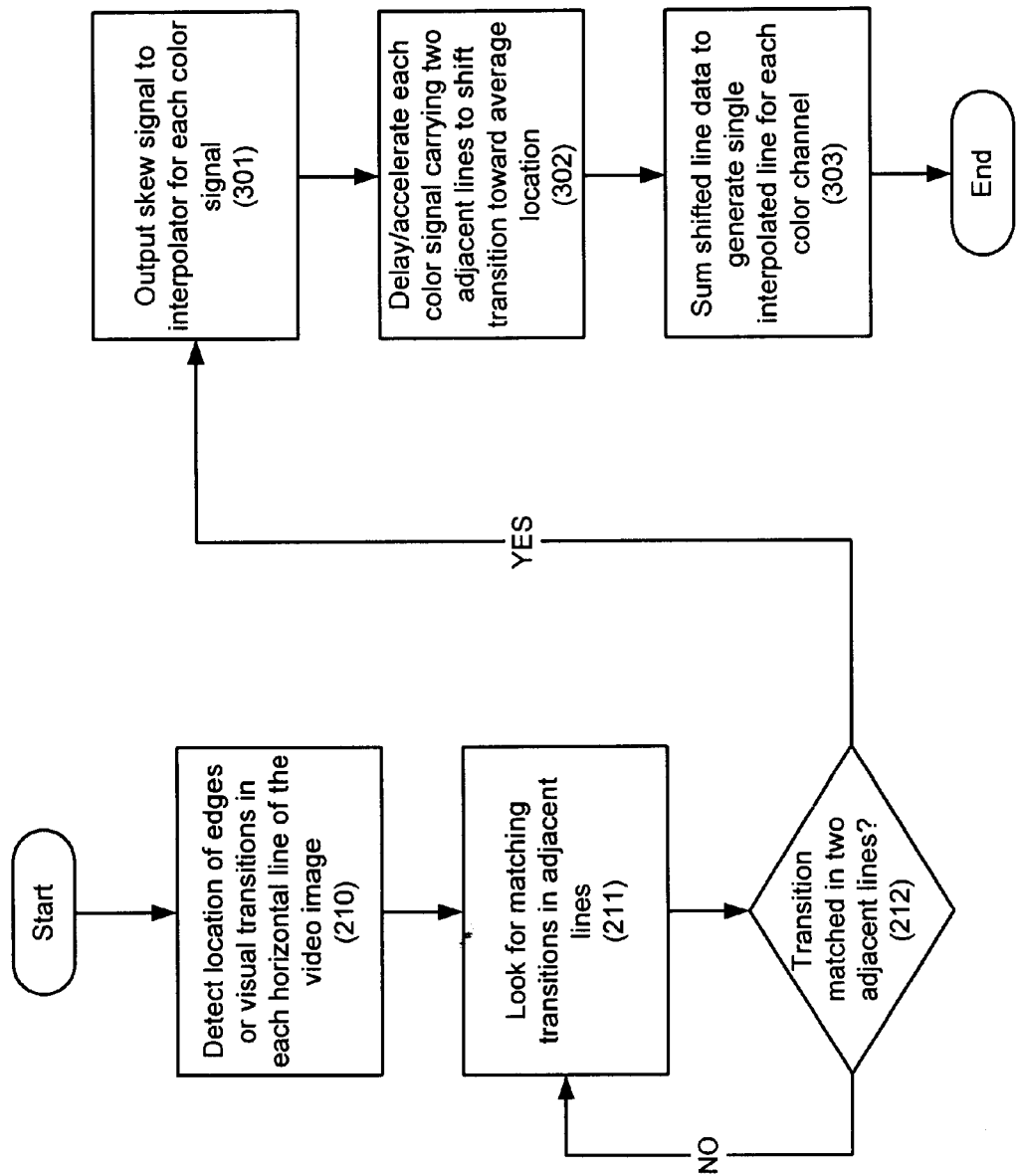
FIG. 8 is a flow chart illustrating a preferred method, according to the present invention, of interpolating lines in a color video upconversion process.

Additionally, FIG. 8 illustrates one possible application of the present invention to upconversion of color video images. As before, this method can be implemented by, for example, a system similar to that illustrated in FIG. 6. However, this method can also be carried out by an appropriate piece of software running on a processor and using the data of the incoming video signal as input data. The flowchart of FIG. 8 serves as a disclosure of and outline for such a software implementation of the invention. Given the disclosure of FIG. 8, one of ordinary skill in the programming arts could prepare a software implementation of the present invention.

As shown in FIG. 8, the method begins by detecting the location of visual transitions in each horizontal scan line of the incoming video signal (210). This may be done, as described above, by monitoring the luma or brightness of the signal. Next, matching transitions in succeeding scan lines will be identified (211). Where such a match is found (212), the two lines will be morphed, i.e., the data stream for each line will be accelerated or delayed to shift the transition in that line toward an average location splitting the difference between the locations of the matched transition in the two succeeding scan lines.

However, in a color video application, the skew signal generated to control the shifting or morphing of the lines is applied to each color component or channel of the signal (e.g., RGB) (301). Successive scan lines for each color component are then morphed according to the skew signal (302). This lines are the summed (303) as described above only for each color channel. In this way, the principles of the present invention can be applied to upconvert a color video signal.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A video signal upconversion system, comprising:
   a detector for detecting visual transitions in a digital video signal;
   a comparator, connected to said detector, for matching visual transitions in successive scan lines in said digital video signal;
   variable delay filters controlled by a skew signal from said comparator for delaying or accelerating said digital video signal so as to shift a visual transition in a scan line toward an average location between matched portions of said transition in successive scan lines; and
   a summing circuit for adding successive scan lines as skewed by said variable delay filters to generate an interpolated scan line.

2. The system of claim 1, further comprising a controlled buffer for interlacing scan lines from said video signal with interpolated scan lines output by said summing circuit.

3. The system of claim 1, wherein said detector is a luma detector.

4. The system of claim 1, wherein said video signal is a color video signal and said variable delay filters shift visual transition in scan lines for each color component of said video signal according to said skew signal.

5. A method of upconverting a video signal, said method comprising:
   detecting visual transitions in a digital video signal;
   matching visual transitions in successive scan lines in said digital video signal;
   delaying or accelerating said digital video signal so as to shift a visual transition in a scan line toward an average location between matched portions of said transition in successive scan lines; and
   adding successive scan lines as skewed by said delaying or accelerating to generate an interpolated scan line.

6. The method of claim 5, further comprising interlacing scan lines from said video signal with interpolated scan lines to generate a high-definition video signal.

7. The method of claim 6, wherein said interlacing is performed with a controlled buffer.

8. The method of claim 5, wherein said video signal is a color video signal and said method further comprises shifting visual transition in scan lines for each color component of said video signal.

9. The method of claim 5, wherein said detecting is performed with a luma detector.

10. The method of claim 5, wherein said matching is performed with a line-to-line comparator.

11. The method of claim 10, wherein said delaying or accelerating is performed with variable delay filters and said method further comprises controlling said variable delay filters with a skew signal from said line-to-line comparator.

12. A system for upconverting a video signal, said method comprising:
   means for detecting visual transitions in a digital video signal;
   means for matching visual transitions in successive scan lines in said digital video signal;
   means for delaying or accelerating said digital video signal so as to shift a visual transition in a scan line toward an average location between matched portions of said transition in successive scan lines; and
   means for adding successive scan lines as skewed by said delaying or accelerating to generate an interpolated scan line.

13. The system of claim 12, further comprising means for interlacing scan lines from said video signal with interpolated scan lines to generate a high-definition video signal.

14. The system of claim 13, wherein said means for interlacing comprise a controlled buffer.

15. The system of claim 12, wherein said video signal is a color video signal and said system further comprises means for shifting visual transition in scan lines for each color component of said video signal.

16. The system of claim 12, wherein said means for detecting comprise a luma detector.

17. The system of claim 12, wherein said means for matching comprises a line-to-line comparator.

18. The system of claim 17, wherein said means for delaying or accelerating comprises variable delay filters controlled with a skew signal from said line-to-line comparator.

19. Computer-readable instructions stored on a computer-readable medium, said instructions causing a computer or processor to upconvert a video signal by:
   detecting visual transitions in said digital video signal;
   matching visual transitions in successive scan lines in said digital video signal;
   delaying or accelerating said digital video signal so as to shift a visual transition in a scan line toward an average location between matched portions of said transition in successive scan lines; and
   adding successive scan lines as skewed by said delaying or accelerating to generate an interpolated scan line.

20. The computer-readable instructions of claim 19, further causing said computer or processor to interlace scan lines from said video signal with interpolated scan lines to generate a high-definition video signal.

21. The computer-readable instructions of claim 19, wherein said video signal is a color video signal and said instructions further cause said computer or processor to shift visual transitions in scan lines for each color component of said video signal.

* * * * *